(12) United States Patent
Roy et al.

(10) Patent No.: US 10,938,898 B2
(45) Date of Patent: Mar. 2, 2021

(54) SYSTEM AND METHOD FOR SYNCHRONIZING ONE OR MORE ALTERATIONS IN A WORK PRODUCT

(71) Applicant: ARC Document Solutions, LLC, San Ramon, CA (US)

(72) Inventors: Rahul Roy, Fremont, CA (US); Srinivasa Rao Mukkamala, Fremont, CA (US); Himadri Majumder, Nadia (IN); Dipali Bhattacharya, Kolkata (IN)

(73) Assignee: ARC Document Solutions, LLC, San Ramon, CA (US)

( * ) Notice: Subject to any disclaimer, the term of this patent is extended or adjusted under 35 U.S.C. 154(b) by 294 days.

(21) Appl. No.: 16/021,503

(22) Filed: Jun. 28, 2018

(65) Prior Publication Data
US 2019/0007487 A1 Jan. 3, 2019

(30) Foreign Application Priority Data
Jun. 30, 2017 (IN) .............................. 201711022926

(51) Int. Cl.
| | |
|---|---|
| H04L 29/08 | (2006.01) |
| G06Q 10/10 | (2012.01) |
| G06N 7/00 | (2006.01) |
| G06F 16/178 | (2019.01) |
| G06F 16/907 | (2019.01) |
| G06F 16/18 | (2019.01) |
| G06N 20/00 | (2019.01) |

(52) U.S. Cl.
CPC ........ H04L 67/1095 (2013.01); G06F 16/178 (2019.01); G06F 16/1873 (2019.01); G06F 16/907 (2019.01); G06N 7/005 (2013.01); G06N 20/00 (2019.01); G06Q 10/101 (2013.01)

(58) Field of Classification Search
CPC .. H04L 67/1095; G06Q 10/101; G06N 20/00; G06N 7/005; G06F 16/178; G06F 16/907; G06F 16/1873
See application file for complete search history.

(56) References Cited

U.S. PATENT DOCUMENTS 10,503,822 B1 * 12/2019 Spencer ................ G06F 40/194
2005/0149343 A1 * 7/2005 Rhoads .................. G06Q 10/10
705/311

(Continued)

OTHER PUBLICATIONS

Yogesh Bajaj, Indian Intellectual Property Written Opinion (Application No. 201711022926), pp. 1-12 (Year: 2020).*

Primary Examiner — Jorge A Casanova
(74) Attorney, Agent, or Firm — Kilpatrick Townsend & Stockton LLP

(57) ABSTRACT

The present application discloses a method 500 for synchronizing and a synchronization system 400 to synchronize alterations made to a work product, by client devices 300, wherein the synchronization system 400 and the client devices 300 are interspersed in a collaborative work environment 100 and wherein the synchronization system 400 comprises a server side memory unit 420 which upon invocation by a server side processor 410 triggers thereat an initiation component 421, a comparison component 422, an evaluation component 423, a scoring component 424, and an integration component 425.

13 Claims, 6 Drawing Sheets

(56) References Cited

U.S. PATENT DOCUMENTS

| | | | |
|---|---|---|---|
| 2013/0019028 A1* | 1/2013 | Myers | G06F 40/134 709/246 |
| 2014/0279843 A1* | 9/2014 | Von Weihe | G06F 16/2358 707/608 |
| 2014/0281872 A1* | 9/2014 | Glover | G06F 40/194 715/229 |
| 2016/0162478 A1* | 6/2016 | Blassin | G06Q 10/063112 706/12 |
| 2017/0169391 A1* | 6/2017 | Mo | G06F 16/176 |
| 2017/0185574 A1* | 6/2017 | Fern | G06Q 10/103 |

* cited by examiner

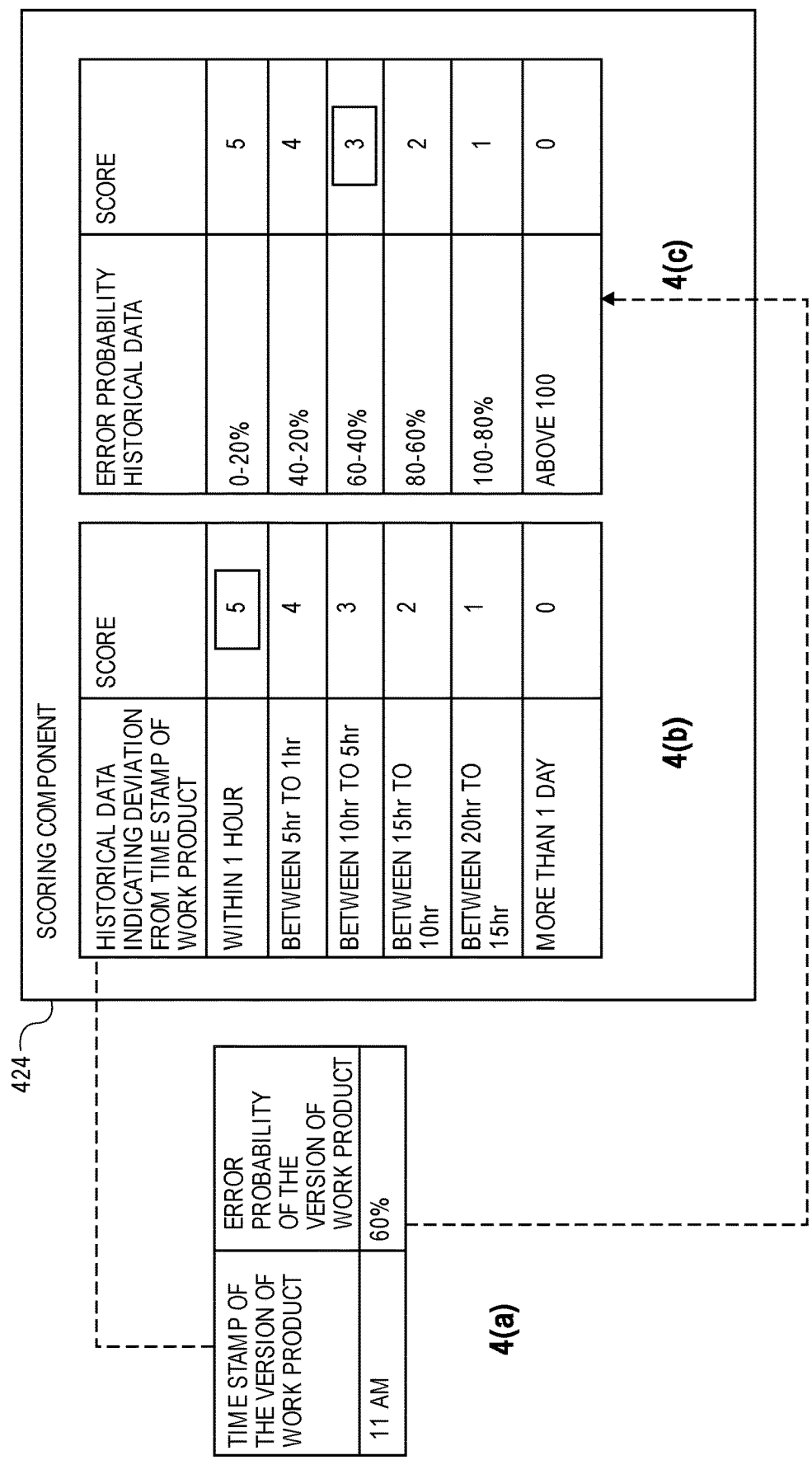

SYSTEM AND METHOD FOR SYNCHRONIZING ONE OR MORE ALTERATIONS IN A WORK PRODUCT

CROSS-REFERENCES TO RELATED APPLICATIONS

This application claims the benefit of Indian Application No. 201711022926, filed Jun. 30, 2017, which is hereby incorporated by reference in its entirety for all purposes.

BACKGROUND

1. Field of the Invention

The present subject matter relates to synchronization of alterations, and more particularly, to synchronization of alterations made to work products that are developed on client devices interspersed in a Collaborative Work Environment.

2. Description of the Related Art

The proliferation of networks such as intranets, extranets, and the internet has done away with traditional corporate environments that required geographical co-location of professionals, and made way for newer Information & Communication Technology based corporate environments wherein multiple persons and/or entities may participate, contribute and develop projects synchronously, irrespective of their geographical locations.

One such environment that has become extremely prevalent in recent times is a collaborative work environment that employs networks such as Metropolitan Area Networks, Local Area Networks, Wide Area Networks, and even the internet, if required to connect multiple client devices through which multiple professionals, registered with the collaborative work environment, interact and share work products among themselves to synchronously complete the project. Person skilled in the art would appreciate that in accordance with the invention, these work products could be word files, image files, audio files, video files or any such other files that need to be shared between those client devices that are configured to develop and execute the project.

While there are multiple systems and methods to ensure prompt and efficient sharing of work products between client devices (e.g. data chunking based systems and methods), a lesser addressed problem arises when multiple alterations are made to the work products during the course of development and execution of the project, and that is the problem of improper synchronization of the alterations made to the work products. Person skilled in the art would appreciate that if these alterations are not properly synchronized with the work product then that could lead to the creation of an erroneously altered version of the work product, which on further use may lead to faulty execution of the project, and in some cases, may even lead to complete failure to execute the project.

There is a need in the art to address the aforesaid problem and offer a solution that intelligently and efficiently synchronizes alternations or alterations in the work products, and in turn, facilitates proper development and execution of the project.

BRIEF SUMMARY

Some embodiments of the present invention are intended to address the above mentioned problems and/or disadvantages and to provide a suitable solution therefor. Accordingly, an aspect is to provide a synchronization system and a method for synchronizing the one or more alternations made to work products shared between the client devices interspersed in the Collaborative Work Environment.

In accordance with an aspect of the present invention, a synchronization system to synchronize one or more alterations made to a work product, by client devices, is provided, wherein the synchronization system comprises a server side memory unit which upon invocation by a server side processor triggers thereat an initiation component, a comparison component, an evaluation component, a scoring component, and an integration component.

In accordance with yet another aspect of the present invention, a method for synchronizing the alterations made to work product developed at the client devices interspersed in the collaborative work environment using the synchronization system, described above, is provided.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the detailed description that follows taken in conjunction with the accompanying drawings, wherein:

FIG. 4 illustrates a preferred manner in which the scoring component 424 calculates the scores based on the time stamp and the error probability of the valid corresponding alteration files with the corresponding metadata tags.

Figure 1:
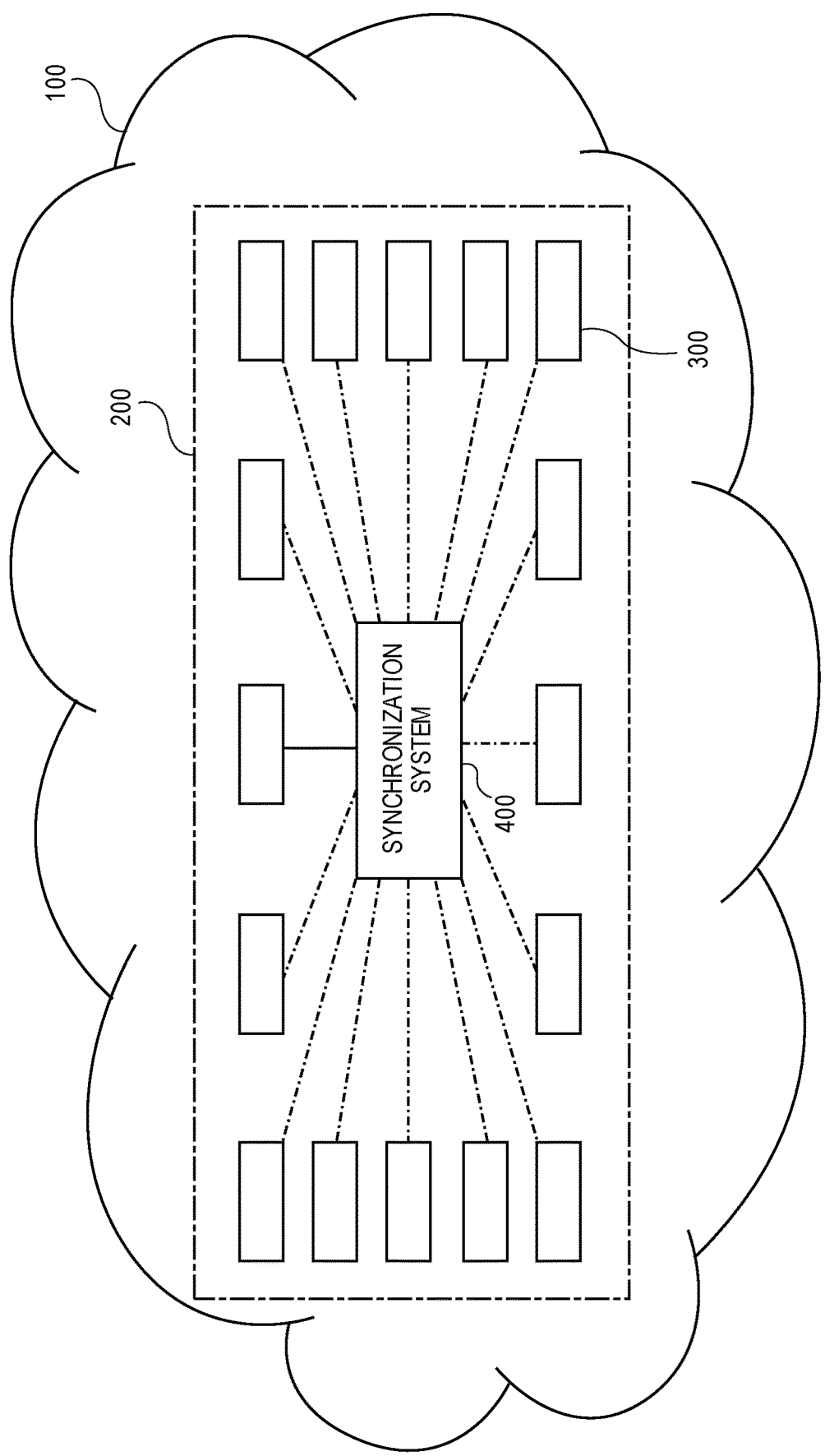
FIG. 1 illustrates a collaborative work environment 100 in accordance with the invention.

It should be appreciated by those skilled in the art that any diagrams herein represent conceptual views of illustrative systems embodying the principles of the present subject matter.

DETAILED DESCRIPTION

Advantages and features may be understood more readily by referring to this detailed description of preferred embodiments and the accompanying drawings. The embodiments disclosed herein are exemplary representations of different aspects and features of the present invention and are therefore not to be construed in a limiting sense. Rather these embodiments should be considered for comprehensively disclosing and thoroughly conveying embodiments of the invention and their aspects thereof, to those skilled in the art. All modifications, equivalents, and alternatives of the invention shall be deemed to fall within the spirit and scope of the disclosure. For the sake of simplicity all aspects of the preferred system and method embodiments are referred using numerals which refer to the same aspects throughout the specification.

As used herein, the singular forms "a", "an" and "the" are intended to include plural forms as well, unless the context clearly indicates otherwise. Likewise, some techniques and mechanisms of the present invention will sometimes be described in singular form for clarity. Such singular descriptions of techniques and mechanisms should be construed to include multiple iterations of those techniques and/or multiple instantiations of those mechanisms, respectively, without deviating from the scope of the invention.

It will be understood that the terms "comprises" and/or "comprising", when used in the specification, specify the presence of stated features, integers, steps, operations, elements, and/or components, but do not preclude the presence or addition of other features, integers, steps, operations, elements, and/or components. Similarly, it will further be understood that, although the terms first, second, third etc., may be used herein to describe some elements, components, regions, layers and/or sections, these elements, components, regions, layers and/or sections should not be limited by these terms. Thus, a first element, component, region, layer and/or section disclosed in the description could be termed as a second element, component, region, layer and/or section, or vice versa, without departing from the teachings of the present invention.

Various techniques and mechanisms of embodiments of the present invention will sometimes describe a connection between two entities. It should be noted that in such context, the connection between two entities would not necessarily mean a direct, unimpeded connection, as a variety of other entities may reside between the two entities. These entities may include without limitation, network peripherals including routers, bridges, modems, hubs, amplifiers, switches, repeaters or a combination thereof. Further the connection between any two entities disclosed in the invention should not only be construed as being dedicated hard wired connections, but should also include virtual and/or wireless connections.

Unless otherwise defined, the terms (including technical and scientific terms) used herein shall have the same meaning as commonly understood by one of ordinary skill in the art. Further, the terms defined in commonly used dictionaries should be interpreted and construed in a manner consistent with their dictionary meaning, and should not be interpreted in an idealized or overly formal sense unless expressly defined.

FIG. 1 to FIG. 4, discussed below are non-limiting illustrations which have been used to explain and describe the invention disclosed herein. Persons skilled in the art will appreciate that the purpose of these figures is to provide clarity to the concepts associated with the various technical embodiments of the invention and not to limit the invention. These figures include without limitation, block diagrams, flowcharts, schematics and/or other simplistic representations that explain the various aspects of the invention with ease and effectiveness.

Referring now to the figures and first to FIG. 1, a collaborative work environment, in accordance with the invention, is referred by the numeral 100. As may be seen in the illustration, the collaborative work environment 100 contains a network 200, client devices 300, and a synchronization system 400, wherein the client devices 300 and the synchronization system 400, are spread across the network 200 of the collaborative work environment 100.

The network 200 could be one or more intranets, Local Area Networks, Wide Area Networks, and Metropolitan Area Networks, either standalone or in combination, or even the Internet, if required, that are either dedicated or shared, and implement communication protocols such as Hypertext Transfer Protocol (HTTP), Transmission Control Protocol/Internet Protocol (TCP/IP), and Wireless Application Protocol (WAP). In a preferred embodiment, the network 200 may further include a variety of network devices including routers, bridges, servers, repeaters, amplifiers, hubs and switches.

The client devices 300 are those one or more client setups and/or installations in the collaborative work environment 100, wherefrom the work products and the alterations therein, are created. In a preferred embodiment, these client devices 300 may be pre-configured with instructions obtained from the registered users of the collaborative work environment 100, wherein the one or more instructions guide and assist in the creation of the work products and/or the alterations therein at the client devices 300 where they are pre-configured.

Figure 2:
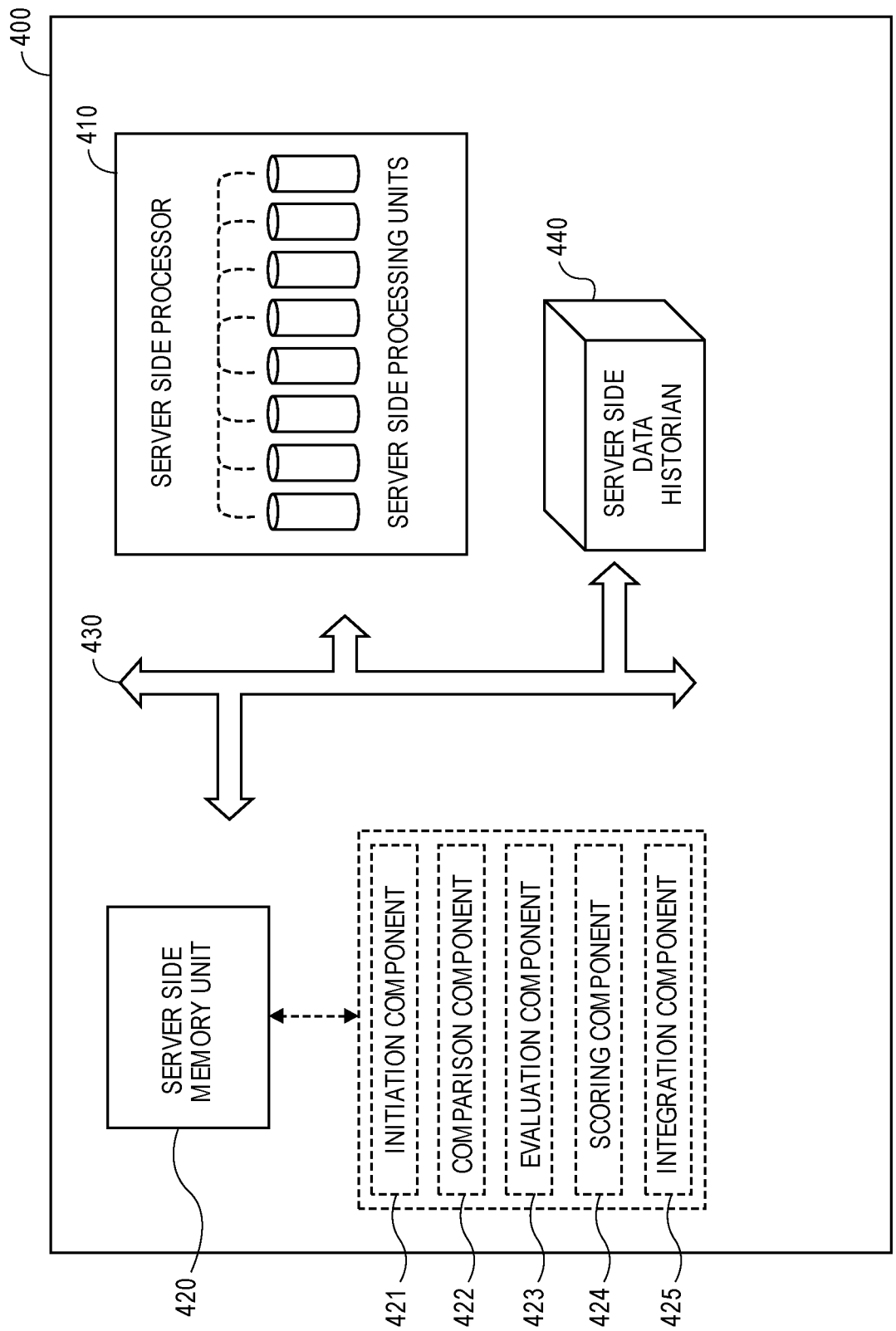
FIG. 2 illustrates a block diagram of a synchronization system 400 in accordance with the invention.

FIG. 2 illustrates a block diagram of the synchronization system 400 in accordance with an embodiment of the invention. As may be seen in the illustration, the synchronization system 400 comprises a server side processor 410, a server side memory unit 420, and a server side I/O interface 430. The server side processor 410 comprises one or more specialized server side processing units including integrated system (bus) controllers, memory management control units, floating point units, graphics processing units, digital signal processing unit, or a combination thereof. The server side processor 410 may be designed and developed from scratch or obtained by substantially reconstructing preexisting processors including embedded processors such as Application-Specific Integrated circuits (ISICs), Digital Signal Processors (DSPs), Field Programmable Gate Arrays (FPGAs), or microprocessors such as ADM Athlon, ADM Duron, AMD Opteron, ARM's range of micro-processors, IBM Power PC Intel core, Intel Itanium, Intel Xeon, Intel Celeron or a combination thereof.

The server side memory unit 420 can include any non-transitory computer-readable medium known in the art including, volatile memory (e.g. RAM), and/or non-volatile memory (e.g. EPROM and flash memory). The server side memory unit 420, on being invoked by the server side processor 410 through one or more signals and/or instructions, triggers thereat, an initiation component 421, a comparison component 422, an evaluation component 423, a scoring component 424, and an integration component 425, all of which are destined to perform one or more operations and/or render one or more functionalities.

The server side processors 410 and the server side memory unit 420 may be disposed in communication with each other via the server side I/O interface 430. The server side I/O interface 430 may employ communication protocols and/or methods such as, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, and cellular (e.g., code-division multiple access (CDMA), high-speed packet access (HSPA+), global system for mobile communications (GSM), long-term evolution (LTE), WiMax, or the like).

As may be seen in the illustration, the synchronization system 400, in a preferred embodiment, may further comprise a server side data historian 440 which may be selected from amongst digital databases, cloud databases, on premise databases, relational databases including Oracle RDBMS, Microsoft SQL Server, IBM DB2, YSQL and Postgre SQL, SOSQL databases, ERPs, CRM systems, and/or a combination thereof, wherein the server side data historian 440 records trends and historical information about the processes of the collaborative work environment 100 for future reference. More specifically, the server side data historian 440 may capture information about status, performance monitoring, quality assurance, tracking and genealogy, work product delivery and management, and such other characteristics relevant to the invention, and store this information at discrete tuples therein, wherein the discrete tuples are edified to access, operate, federate, combine, sync, and link with one other. In a preferred embodiment, the server side data historian 440 may also possess data compression and data presentation capabilities.

Now, therefore, in light of the above definitions and descriptions, the invention is initiated when two or more versions of the work product are received at the synchronization system 400. Upon receiving the two or more versions of the work product, the server side processor 410 is invoked which in turn instructs the server side memory unit 420 to firstly trigger the initiation component 421 that receives the two or more versions of the work product and appends to each version of the work product, a corresponding metadata tag which as per a preferred variation includes, name of the creator of that version of the work product, designation of the creator of that version of the work product, time stamp of that version of the work product, and error probability of that version of the work product wherein the error probability is calculable, statistically, from historical data pertaining to the quantum and frequency with which the creator of that version of the work product is known to make errors.

The two or more versions of the work product with the corresponding metadata tags are thereafter subjected to the comparison component 422 that communicatively connects the initiation component 421 to execute a two-fold operation. Firstly, the comparison component 422 compares the two or more versions of the work product with the corresponding metadata tags and identifies alterations made therein, and thereafter records the alterations identified thereof in corresponding alteration files. Next the comparison component 422 attaches the corresponding metadata tags of the two or more versions of the work product to the corresponding alteration files.

Figure 3:
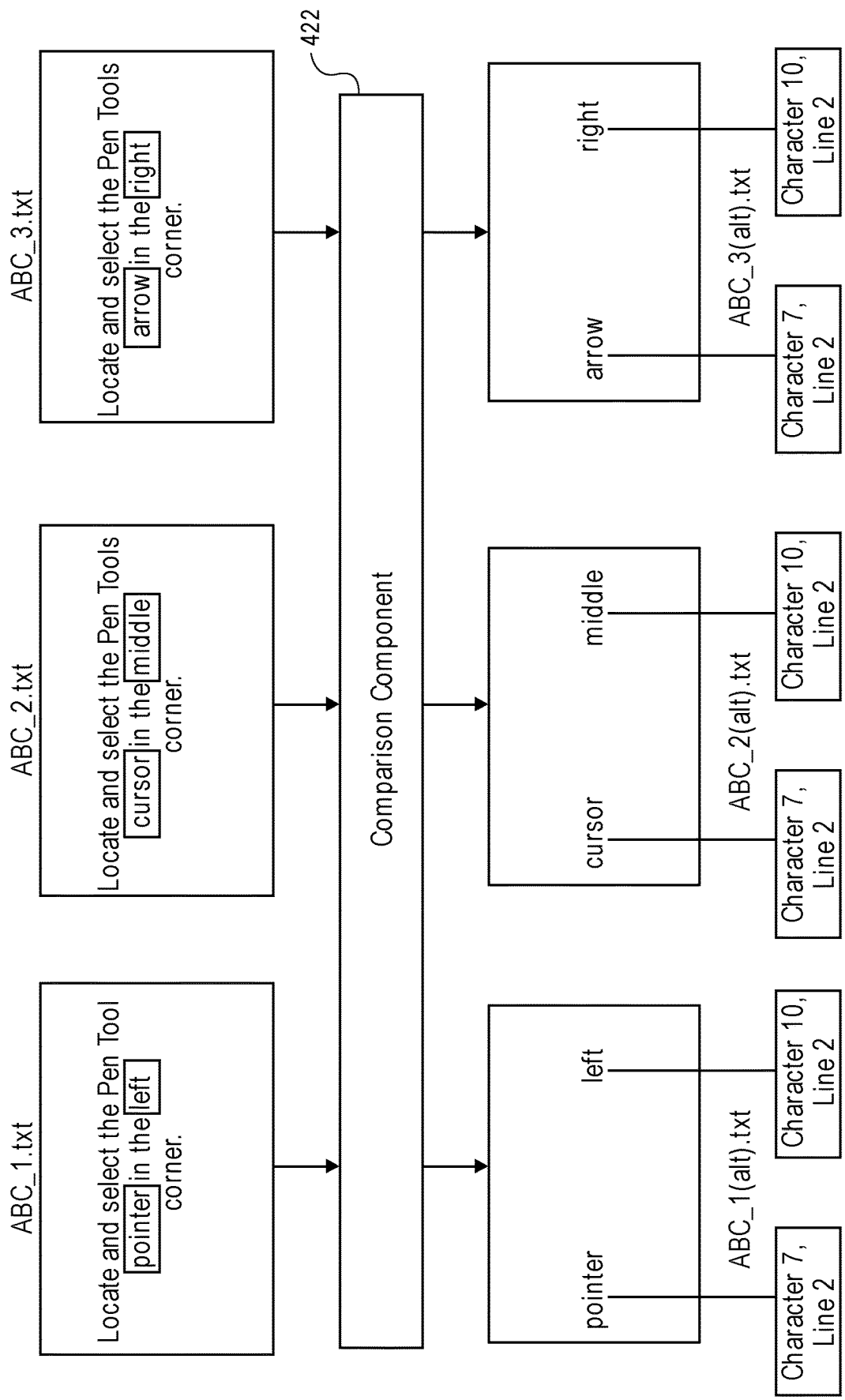
FIG. 3 illustrates a preferred manner in which the comparison component 422 compares the two or more versions of the work product with the corresponding metadata tags and identifies alterations therein.

FIG. 3 illustrates the manner in which the comparison component 422 compares the two or more versions of the work product with the corresponding metadata tags and identifies alterations therein. As may be seen in the illustration, when three versions with the corresponding metadata tags, for the work product ABC.txt viz. ABC_1.txt, ABC_2.txt and ABC_3.txt (corresponding metadata tags not illustrated for the sake of simplicity), are inputted to the comparison component 422, then they are compared to identify alterations in each version of the work product which are then recorded in corresponding alteration files viz. ABC_1(alt).txt, ABC_2(alt).txt, and ABC_3(alt).txt such that ABC_1(alt).txt corresponds to ABC_1.txt, ABC_2(alt).txt corresponds to ABC_2.txt, and ABC_3(alt).txt corresponds to ABC_3.txt. Thereafter, in accordance with the remaining functioning of the comparison component 422, the corresponding metadata tags in ABC_1.txt, ABC_2.txt, and ABC_3.txt are attached to the corresponding alteration files ABC_1(alt).txt, ABC_2(alt).txt, and ABC_3(alt).txt, respectively.

The proceeds of the comparison component 422, that is, the corresponding alteration files with the corresponding metadata tags are forwarded to the evaluation component 423 that checks whether the creators of the corresponding alteration files with corresponding metadata tags were authorized to create so or not.

In accordance with the exemplary embodiment of the invention, the evaluation component 423 checks whether the alterations made in each corresponding alteration file with the corresponding metadata tag are valid or not, by referring to the name and the designation of the creator of that corresponding alteration file from its corresponding metadata tag, and checking whether the creator bearing the name and designation referred thereof has been authorized by the higher management to alter the work product or not. In case, this operation at the evaluation component 423 yields that a particular corresponding alteration file with a particular corresponding metadata tag is not valid as its creator was not authorized by the higher management then the corresponding alteration file with the corresponding metadata tag and the version of the work product to which the corresponding alteration file corresponds are immediately discarded. However, if this operation of the evaluation component 423 yields that a particular corresponding alteration file with a particular corresponding metadata tag is valid as its creator was authorized by the higher management then the evaluation component 423, transfers all the valid corresponding alteration files with corresponding metadata tags to the scoring component 424.

The scoring component 424, upon receiving the valid corresponding alteration files with the corresponding metadata tags, firstly, calculates the time stamp score and the error probability score of the valid corresponding alteration files with the corresponding metadata tags received thereof. Person skilled in the art would obviously understand that the score based on the time stamp would be lesser if the time stamp value is earlier in time as that would mean that the alterations recorded in the valid corresponding alteration file with corresponding metadata tag are old, and most likely, outdated. Likewise, person skilled in the art would obviously understand that the score based on error probability is likely to be lesser if the error probability value is higher as high error probability value would mean that the contents of the valid corresponding alteration file with the corresponding metadata tag are likely to be erroneous.

FIG. 4 illustrates a preferred manner in which the scoring component 424 calculates the scores based on the time stamp and the error probability of the valid corresponding alteration files with the corresponding metadata tags. As may be seen in the illustration, firstly the time stamp value and the error probability value are read from the corresponding metadata tag of the valid corresponding alteration file, which in the illustration are read as 11 AM and 60%, respectively (marked as 4(a)). Thereafter, the time stamp value is matched against a first scoring reference (marked as 4(b)), and the error probability value is matched against a second scoring reference (marked as 4(c)), to determine a time stamp score and an error probability score, respectively. Person skilled in the art would appreciate that in accordance with the invention the first scoring reference and the second scoring reference are tables substantiating upon the scores to be given for particular ranges of values for the time stamp and the error probability, respectively, wherein these value ranges and corresponding scores are determined based on the historical scoring trends and patterns. Thus, by referring to the first scoring reference and the second scoring reference, the time stamp score and the error probability score may be calculated, respectively. In the illustration, the time stamp score is boxed in the first scoring reference 4(b) (score calculated assuming that the original work product was created at 10:30 AM), and the error probability score is boxed in the second scoring reference 4(c).

Thereafter, the scoring component 424 triggers its second operation of calculating a cumulative score for the valid corresponding alteration file with the corresponding metadata tag, based on time stamp score and the error probability score calculated thereof. In accordance with the invention, the cumulative score may be calculated by adding and/or convoluting the time stamp scores and the error probability scores calculated thereof by employing mathematical models including without limitation, wavelet transform, time-frequency approaches, Fourier transform, Wigner-Ville Distribution (WVD), statistical measures, and higher-order statistics. Further, Artificial Intelligence based approaches may also be employed for calculating the cumulative scores using Artificial Neural Networks (ANN), dynamic recurrent neural networks (DRNN), fuzzy logic system, Genetic Algorithm (GA), and Hidden Markov Model (HMM).

The proceeds of the scoring component 424, that is, the cumulative scores of the valid corresponding alteration files with the corresponding metadata tags, pertaining to a particular work product, are thereafter moved to the integration component 425 that compares the cumulative scores to determine that valid corresponding alteration file with the corresponding metadata tag having the highest cumulative score, separates the corresponding alteration file having the highest cumulative score from the corresponding alteration file with the corresponding metadata tag having the highest cumulative score, and integrates the corresponding alteration file having the highest cumulative score, separated thereof, with the particular work product thereby updating it for further use. Once the update is completed the integration component 425 discards all the other valid corresponding alteration files with the corresponding metadata tags, pertaining to the particular work product, and also discards the two or more versions of the particular work product to which the other valid corresponding alteration files correspond, and thus achieves the intended purpose of the synchronization system 400.

Figure 5A:
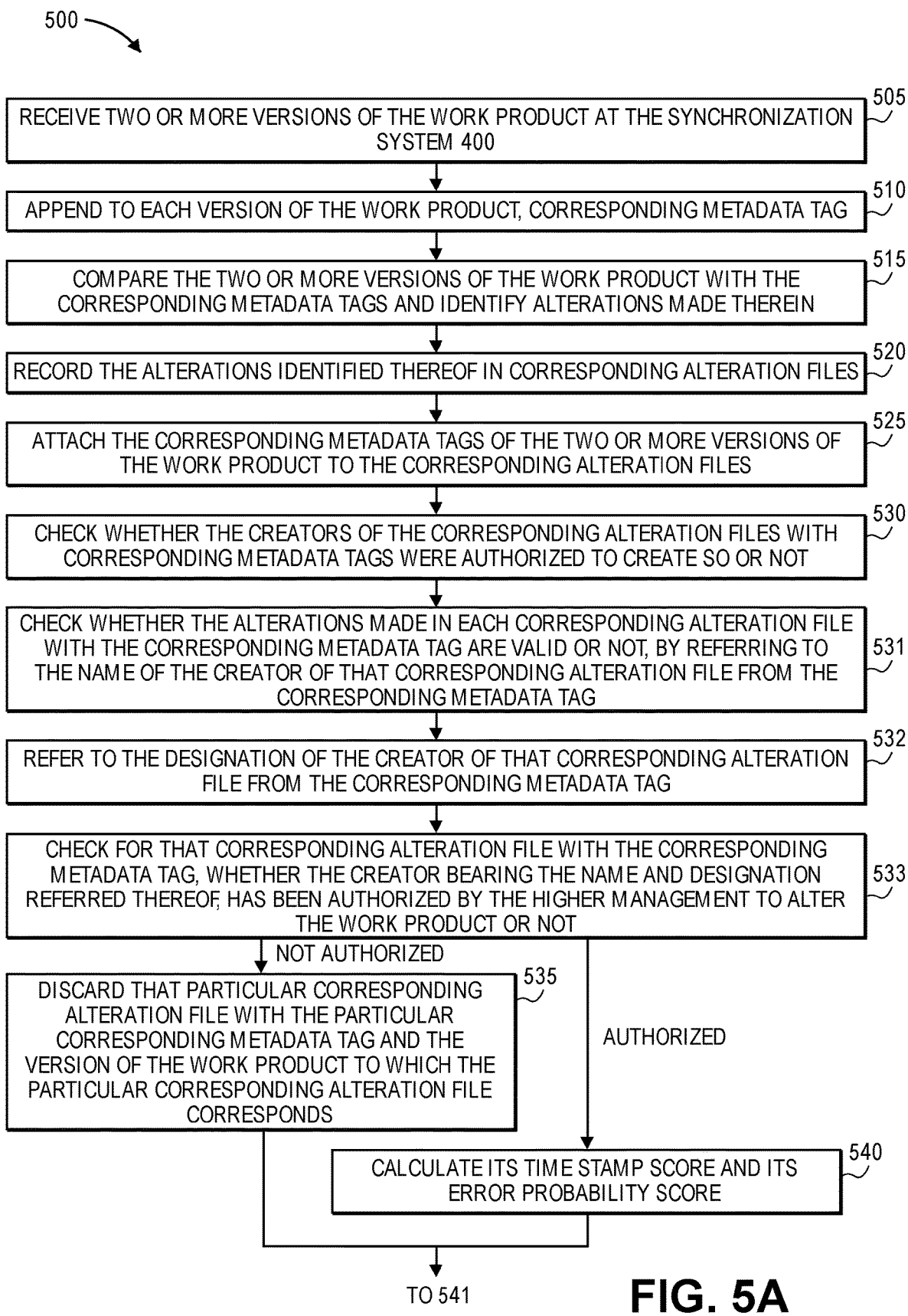
FIGS. 5A and 5B are a flowchart of a process in accordance with an embodiment.
Figure 5B:
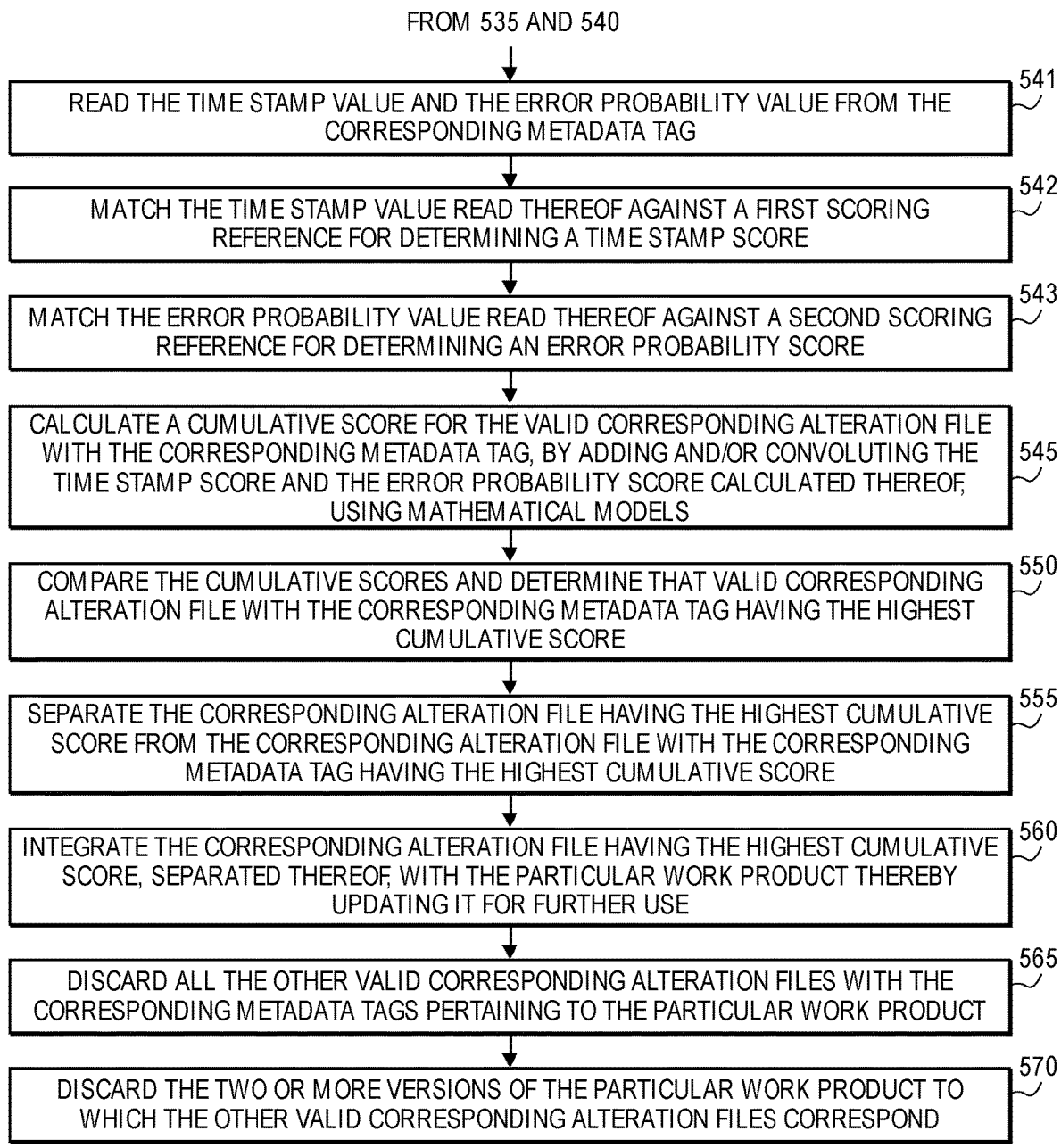

In FIGS. 5A-5B, a method 500 for synchronizing the alterations made to work product developed at the client devices 300 interspersed in the collaborative work environment 100 using the synchronization system 400 is also disclosed herein. The method 500 is initiated by receiving two or more versions of the work product at the synchronization system 400, 505, and appending to each version of the work product, corresponding metadata tag 510 which, as per a preferred variation may include, name of the creator of that version of the work product, designation of the creator of that version of the work product, time stamp of that version of the work product, and an error probability of that version of the work product wherein the error probability is calculable, statistically, from historical data pertaining to the quantum and frequency with which the creator of that version of the work product is known to make errors.

The two or more versions of the work product with the corresponding metadata tags are thereafter subjected to the next step of the method 500 and that is, comparing the two or more versions of the work product with the corresponding metadata tags and identifying alterations made therein 515. After identifying the alterations made in the two or more versions of the work product 515, the step of recording the alterations identified thereof in corresponding alteration files 520 is triggered. The corresponding alteration files obtained from the step 520 are thereafter subjected to the step of attaching the corresponding metadata tags of the two or more versions of the work product to the corresponding alteration files 525.

The proceeds of step 525, that is, the corresponding alteration files with the corresponding metadata tags, are subjected to the next step of checking whether the creators of the corresponding alteration files with corresponding metadata tags were authorized to create so or not 530. In accordance with the method 500, the step 530 checks whether the alterations made in each corresponding alteration file with the corresponding metadata tag are valid or not, by referring to the name of the creator of that corresponding alteration file from the corresponding metadata tag 531, and by referring to the designation of the creator of that corresponding alteration file from the corresponding metadata tag 532, and thereafter checking, for that corresponding alteration file with the corresponding metadata tag, whether the creator bearing the name and designation referred thereof, has been authorized by the higher management to alter the work product or not 533.

In case the step 530, and the sub steps 531, 532, 533 thereof, reveals that a particular corresponding alteration file with a particular corresponding metadata tag is not valid as its creator was not authorized by the higher management then the step of discarding that particular corresponding alteration file with the particular corresponding metadata tag and the version of the work product to which the particular corresponding alteration file corresponds 535 is triggered.

If, however, the step 530 and the sub steps 531, 532, 533 thereof, reveals that a particular corresponding alteration file with a particular corresponding metadata tag is valid as its creator was authorized by the higher management, then the method 500 triggers for that particular corresponding alteration file with the particular corresponding metadata tag, the next step of calculating its time stamp score and its error probability score 540. In a preferred embodiment, the calculating of the scores based on the time stamp and the error probability of the valid corresponding alteration file with the corresponding metadata tag 540 may be achieved by firstly reading the time stamp value and the error probability value from the corresponding metadata tag 541. After reading 541, the sub step of matching the time stamp value read thereof against a first scoring reference for determining a time stamp score 542 and the sub step of matching the error probability value read thereof against a second scoring reference for determining an error probability score 543, may be triggered, wherein the first scoring reference and the second scoring reference of the sub step 542 and the sub step 543, respectively, are tables substantiating upon the scores to be given for particular ranges of values for the time stamp and the error probability, respectively, wherein these value ranges and corresponding scores are determined based on the historical scoring trends and patterns.

Thereafter, the method 500 triggers the step of calculating a cumulative score for the valid corresponding alteration file with the corresponding metadata tag, by adding and/or convoluting the time stamp score and the error probability score calculated thereof, using mathematical models including without limitation, wavelet transform, time-frequency approaches, Fourier transform, Wigner-Ville Distribution (WVD), statistical measures, and higher-order statistics 545. Further, Artificial Intelligence based approaches may also be employed for calculating the cumulative scores 545 using Artificial Neural Networks (ANN), dynamic recurrent neural networks (DRNN), a fuzzy logic system, Genetic Algorithm (GA), and Hidden Markov Model (HMM).

The proceeds of step 545, that is, the cumulative scores of the valid corresponding alteration files with the corresponding metadata tags, pertaining to a particular work product, are thereafter subjected to the step of comparing the cumulative scores and determining that valid corresponding alteration file with the corresponding metadata tag having the highest cumulative score 550. Upon determining the valid corresponding alteration file with the corresponding metadata tag having the highest cumulative score 550, the method triggers the next two steps of separating the corresponding alteration file having the highest cumulative score from the corresponding alteration file with the corresponding metadata tag having the highest cumulative score 555, and integrating the corresponding alteration file having the highest cumulative score, separated thereof, with the particular work product thereby updating it for further use 560.

After the integrating of the corresponding alteration file, and the subsequent updating of the work product 560, the work product is deemed to be properly updated and declared fit for future use. Thus after step 560, the method 500 performs the steps of discarding all the other valid corresponding alteration files with the corresponding metadata tags pertaining to the particular work product 565 and discarding the two or more versions of the particular work product to which the other valid corresponding alteration files correspond 570, before concluding it is working.

While the present invention has been particularly shown and described in sufficient detail, through exemplary embodiments thereof, it will be understood by those of ordinary skill in the art that other embodiments may be utilized and that other changes may be made in form and details, without departing from the scope of the present invention.

What is claimed is:

1. A synchronization system 400 to synchronize alterations made to a work product, by client devices 300, wherein the synchronization system 400 and the client devices 300 are interspersed in a collaborative work environment 100 and wherein the synchronization system 400 is characterized by—
   a server side processor 410 that comprises one or more specialized processing units; and
   a server side memory unit 420 which upon invocation by the server side processor 410 triggers thereat—
      an initiation component 421 that, when executed by the processor, receives two or more versions of the work product and appends to each version of the work product a corresponding metadata tag,
      a comparison component 422 that, when executed by the processor, compares the two or more versions of the work product with the corresponding metadata tags, identifies alterations made therein, records the identified alterations in corresponding alteration files, and attaches the corresponding metadata tags of the two or more versions of the work product to the corresponding alteration files,
      an evaluation component 423 that, when executed by the processor, checks whether the alterations made in each corresponding alteration file with the corresponding metadata tag are valid or not,
      a scoring component 424 that, when executed by the processor, calculates a time stamp score and an error probability score for each of the corresponding alteration files found to be valid and calculates a cumulative score for each of the corresponding alteration files found to be valid, and
      an integration component 425 that, when executed by the processor, compares the cumulative scores of the valid corresponding alteration files with the corresponding metadata tags, determines a valid corresponding alteration file, pertaining to a particular work product, having a highest cumulative score, separates the corresponding alteration file having the highest cumulative score from the corresponding metadata tag, and integrates the corresponding separated alteration file having the highest cumulative score with the particular work product; and
   wherein, the server side processor 410 and the server side memory unit 420 are disposed in communication via a server side I/O interface 430.

2. The synchronization system 400 as claimed in claim 1 wherein the synchronization system 400 further comprises a server side data historian 440 that records trends and/or historical information about the synchronization system 400 wherein the trends and/or the historical information, pertain without limitation to attributes including status, performance, quality, genealogy, and work product delivery and management.

3. The synchronization system 400 as claimed in claim 1 wherein
   each appended metadata tag comprises—
      a name of a creator of the version of the work product,
      a designation of the creator of the version of the work product,
      a time stamp of the version of the work product, and
      an error probability of the version of the work product wherein, the error probability is calculable, statistically, from historical data pertaining to a quantum and frequency with which the creator of the version of the work product is known to make errors.

4. The synchronization system 400 as claimed in claim 1 wherein upon invocation by the server side processor 410, the evaluation component 423 checks whether the alterations made in each corresponding alteration file with the corresponding metadata tag are valid or not, by—
   receiving the corresponding alteration files with the corresponding metadata tags from the comparison component 422;
   referring, for each corresponding alteration file with the corresponding metadata tag, to a name of a creator of that corresponding alteration file from the corresponding metadata tag;
   referring, for each corresponding alteration file with the corresponding metadata tag, to a designation of the creator of the corresponding alteration file from the corresponding metadata tag; and
   checking, for each corresponding alteration file with the corresponding metadata tag, whether the creator of the corresponding alteration file has been authorized by a higher management to alter the work product or not;
   wherein, a particular corresponding alteration file with a particular corresponding metadata tag would be invalid if its creator is not authorized by the higher management to alter the work product, in which case, the corresponding alteration file with the corresponding metadata tag and the version of the work product to which the corresponding alteration file corresponds would be discarded; and
   wherein, a particular corresponding alteration file with a particular corresponding metadata tag would be valid if its creator is authorized by the higher management to alter the work product, in which case, the corresponding alteration file would be forwarded to the scoring component 424 for further processing.

5. The synchronization system as claimed in claim 1 wherein the scoring component 424 calculates the time stamp score and the error probability score for the valid corresponding alteration file with the corresponding metadata tag received thereof, by—
   reading the time stamp score and the error probability score from the corresponding metadata tag of the corresponding alteration file;
   matching the time stamp score read thereof against a first scoring reference for determining a time stamp score; and
   matching the error probability score read thereof against a second scoring reference for determining an error probability score;
   wherein the first scoring reference and the second scoring reference are tables substantiating upon the scores to be given for particular ranges of values for the time stamp and the error probability, respectively, and wherein these ranges of values and corresponding scores are determined based on historical scoring trends and patterns.

6. The synchronization system 400 of claim 1 wherein scoring component 424 calculates a cumulative score for the valid corresponding alteration file with the corresponding metadata tag, based on time stamp score and the error probability score calculated thereof by adding and/or convoluting the time stamp score and the error probability score calculated thereof by employing mathematical models including wavelet transform, time-frequency approaches, Fourier transform, Wigner-Ville Distribution (WVD), statistical measures, and higher-order statistics, and/or by employing artificial intelligence (AI) based approaches including Artificial Neural Networks (ANN), dynamic recurrent neural networks (DRNN), fuzzy logic system, Genetic Algorithm (GA), and Hidden Markov Model (HMM).

7. The synchronization system 400 as claimed in claim 1 wherein, upon integration of the valid corresponding alteration file having the highest cumulative score with the particular work product, the integration component 425—
   discards all other valid corresponding alteration files with the corresponding metadata tags for the particular work product, and
   discards the two or more versions of the particular work product to which the other valid corresponding alteration files, correspond.

8. A method 500 for synchronizing alterations made to a work product developed at client devices 300 interspersed in a collaborative work environment 100 using a synchronization system 400 wherein the method comprises the steps of—
   receiving two or more versions of the work product at the synchronization system 400, 505;
   appending to each version of the work product, a corresponding metadata tag 510;
   comparing the two or more versions of the work product with the corresponding metadata tags and identifying alterations made therein 515;
   recording the alterations identified thereof in corresponding alteration files 520;
   attaching the corresponding metadata tags of the two or more versions of the work product to the corresponding alteration files 525;
   checking whether the alterations made in each corresponding alteration file with the corresponding metadata tag are valid or not 530;
   for alteration files with alterations found to be invalid 535, discarding the thew corresponding alteration files with the corresponding metadata tags;
   calculating a time stamp score and an error probability score for each of the corresponding alteration files found to be valid 540;
   calculating a cumulative score for each of the valid corresponding alteration files;
   comparing the cumulative scores of the valid corresponding alteration files with the corresponding metadata tags, pertaining to a particular work product and determining a valid corresponding alteration file with the corresponding metadata tag having a highest cumulative score 550;
   separating the corresponding alteration file having the highest cumulative score from the corresponding metadata tag having the highest cumulative score 555; and
   integrating the corresponding alteration file having the highest cumulative score, separated thereof, with the particular work product 560.

9. The method 500 as claimed in claim 8 comprising the step of attaching the corresponding metadata tags of the two or more versions of the work product to the corresponding alteration files 525, wherein each corresponding metadata tag comprises—
   a name of a creator of the version of the work product;
   a designation of the creator of the version of the work product;
   a time stamp of the version of the work product; and
   an error probability of the version of the work product, wherein the error probability is calculable, statistically, from historical data pertaining to a quantum and frequency with which the creator of the version of the work product is known to make errors.

10. The method 500 as claimed in claim 8 wherein the step of checking whether the alterations made in each corresponding alteration file with the corresponding metadata tag are valid or not 530, comprises sub steps of—
    referring to a name of a creator of the corresponding alteration file from the corresponding metadata tag 531;
    referring to a designation of the creator of the corresponding alteration file from the corresponding metadata tag 532; and
    checking, for the corresponding alteration file with the corresponding metadata tag, whether the creator of the corresponding alteration file has been authorized by a higher management to alter the work product or not 533.

11. The method 500 as claimed in claim 8 wherein the step of calculating the time stamp score and the error probability score for the corresponding alteration files found to be valid 540 comprises sub steps of—
    reading the time stamp score and the error probability score from the corresponding metadata tag of the valid corresponding alteration file with the corresponding metadata tag 541;
    matching, for that valid corresponding alteration file with the corresponding metadata tag, the time stamp score read thereof against a first scoring reference for determining a time stamp score 542; and
    matching, for that valid corresponding alteration file with the corresponding metadata tag, the error probability score read thereof against a second scoring reference for determining an error probability score 543;

wherein the first scoring reference and the second scoring reference are tables substantiating upon the scores to be given for particular ranges of values for the time stamp and the error probability, respectively, and wherein these value ranges and corresponding scores are determined based on historical scoring trends and patterns.

12. The method 500 as claimed in claim 8 wherein the step of calculating the cumulative score for the valid corresponding alteration file is achieved by adding and/or convoluting the time stamp score and the error probability score calculated thereof, using mathematical models including, wavelet transform, time-frequency approaches, Fourier transform, Wigner-Ville Distribution (WVD), statistical measures, and higher-order statistics 545, and/or by using AI based approaches including Artificial Neural Networks (ANN), dynamic recurrent neural networks (DRNN), fuzzy logic system, Genetic Algorithm (GA), and Hidden Markov Model (HMM).

13. The method 500 as claimed in claim 8 wherein upon integrating the corresponding alteration file having the highest cumulative score with the particular work product 560, the method 500 performs an additional step of—
  discarding all other valid corresponding alteration files with the corresponding metadata tags pertaining to the particular work product 565; and
  discarding the two or more versions of the particular work product to which the other valid corresponding alteration files correspond 570.

* * * * *